(12) United States Patent
Xiong et al.

(10) Patent No.: US 11,335,089 B2
(45) Date of Patent: May 17, 2022

(54) FOOD DETECTION AND IDENTIFICATION METHOD BASED ON DEEP LEARNING

(71) Applicant: Zhejiang Normal University, Jinhua (CN)

(72) Inventors: Jiping Xiong, Jinhua (CN); Lingfeng Ye, Jinhua (CN); Lingyun Zhu, Jinhua (CN); Jinhong Li, Jinhua (CN)

(*) Notice: Subject to any disclaimer, the term of this patent is extended or adjusted under 35 U.S.C. 154(b) by 183 days.

(21) Appl. No.: 16/892,330

(22) Filed: Jun. 4, 2020

(65) Prior Publication Data

US 2020/0293781 A1 Sep. 17, 2020

(30) Foreign Application Priority Data

Jul. 1, 2019 (CN) .......................... 201910586649.9

(51) Int. Cl.
*G06V 20/20* (2022.01)
*G06N 3/04* (2006.01)

(52) U.S. Cl.
CPC ............... *G06V 20/20* (2022.01); *G06N 3/04* (2013.01)

(58) Field of Classification Search
CPC ........ G06V 20/20; G06V 20/00; G06V 20/68; G06V 10/82; G06N 3/04–08; G06N 3/0454; G06N 3/084; G06K 9/6273; G06K 9/6268; G06K 9/6267; G06K 9/6256; G06K 9/6262; G06K 9/6269; G06K 9/00771; G06K 9/00671; G06K 9/2018; G06K 2209/17; G06F 16/783; G06F 16/953; G06F 16/285; G06F 16/9535; G06Q 50/10–12; G06T 2207/30128; G06T 2207/20084; G06T 7/0004
See application file for complete search history.

(56) References Cited

U.S. PATENT DOCUMENTS

| | | | |
|---|---|---|---|
| 9,230,194 B2* | 1/2016 | Rabinovich | G06V 30/194 |
| 2010/0173269 A1* | 7/2010 | Puri | G09B 19/0092 434/127 |
| 2011/0182477 A1* | 7/2011 | Tamrakar | G06T 7/44 382/110 |
| 2013/0058566 A1* | 3/2013 | Sato | G06K 9/6269 382/159 |
| 2015/0170001 A1* | 6/2015 | Rabinovich | G06K 9/66 382/110 |
| 2018/0211139 A1* | 7/2018 | Bui Tran | G06K 9/6217 |
| 2019/0050749 A1* | 2/2019 | Sanketi | G06F 9/44505 |
| 2019/0171707 A1* | 6/2019 | Rapaport | G06N 3/08 |
| 2019/0200797 A1* | 7/2019 | Diao | F24C 7/082 |
| 2019/0213443 A1* | 7/2019 | Cunningham | G06K 9/627 |
| 2019/0348044 A1* | 11/2019 | Chun | G06N 3/004 |

(Continued)

*Primary Examiner* — Michael S Osinski

(57) ABSTRACT

The present invention discloses a food detection and identification method based on deep learning, which realizes food positioning and identification by a deep convolutional network. The method comprises: firstly, training a general multi target positioning network and a classification network by using food pictures; secondly, inputting the results of the positioning network into the classification network; finally, providing a classification result by the classification network. The method uses two deep convolutional networks with different functions to respectively detect and identify the food, which can effectively reduce the labeling cost of the food and improve the accuracy of positioning and identification.

4 Claims, 4 Drawing Sheets

(56) References Cited

U.S. PATENT DOCUMENTS

| | | | |
|---|---|---|---|
| 2019/0384990 A1* | 12/2019 | Kim | G06T 7/74 |
| 2020/0003482 A1* | 1/2020 | Kim | G06V 20/64 |
| 2020/0090320 A1* | 3/2020 | Xu | G06K 9/6267 |
| 2020/0151517 A1* | 5/2020 | Choi | G16Y 20/40 |
| 2020/0151555 A1* | 5/2020 | Kozhaya | G06N 3/08 |
| 2020/0151578 A1* | 5/2020 | Chen | G06N 20/00 |
| 2020/0351557 A1* | 11/2020 | Drake | G06K 9/6267 |
| 2021/0043108 A1* | 2/2021 | Baumback | G06Q 10/10 |
| 2021/0049422 A1* | 2/2021 | Yoon | G06N 3/08 |
| 2021/0117717 A1* | 4/2021 | Ha | G06K 9/628 |
| 2021/0158918 A1* | 5/2021 | Neumann | G16H 50/20 |
| 2021/0182667 A1* | 6/2021 | Maeng | G06N 3/08 |
| 2021/0204553 A1* | 7/2021 | Mehta | G06K 9/6263 |
| 2021/0228022 A1* | 7/2021 | Liu | A47J 37/041 |
| 2021/0279855 A1* | 9/2021 | Shangin | G06V 10/30 |
| 2021/0293685 A1* | 9/2021 | Schondube | B01L 3/56 |
| 2021/0329892 A1* | 10/2021 | Kozachenok | H04N 5/2259 |
| 2021/0346916 A1* | 11/2021 | Kumar | B07C 5/342 |

* cited by examiner

FOOD DETECTION AND IDENTIFICATION METHOD BASED ON DEEP LEARNING

TECHNICAL FIELD

The present invention relates to the field of computer vision, and particularly relates to a food detection and identification method based on deep learning.

BACKGROUND

At present, an automatic billing system of a dining hall mainly has a traditional identification and billing solution based on RFID tags and an automatic food identification solution based on deep learning of a convolutional neural network. The former solution has the advantages that an identification accuracy rate is high, the same set of RFID tags can be suitable for all restaurants and practical promotion is convenient, and has the disadvantages of high cost and easy consumption of RFID chip, under a high temperature environment. The latter solution has the advantages of needing no reformation of the existing dinner plates and dinnerware, directly identifying food names and facilitating background analysis of subsequent sales volume and health data, and has the disadvantages that a large number of food pictures of a restaurant shall be collected for each restaurant, and all food in the pictures shall be manually labeled on the collected pictures to form labeled data for deep learning and model learning, which consumes time and money and greatly influences the large-scale promotion based on a deep learning, solution.

With respect to the problems in the above solutions, the patent of the present invention proposes an improved food detection and identification method based on deep learning. The core is to train a general multi-target positioning network applicable to all restaurants and a classification network for each restaurant through a deep convolutional neural network. The general multi-target positioning network only needs to be trained once. After the training is completed, the food in different restaurants can be positioned. The classification network can be used to identify after positioning. The classification network does not need expensive and time-consuming manual labeling of the collected pictures. The food pictures of the restaurants only need to be placed in corresponding directories according to the food category to start the training process. Therefore, the combination method of the general multi-target positioning network and the classification network proposed by the present invention can greatly reduce the labor cost and can be promoted and applied in large scale.

SUMMARY

The purpose of the present invention is to position and identify the food through a general multi-target positioning network and a classification network, to detect the food and adapt to various actual, restaurant environments.

To achieve the above purpose, the present invention provides a food detection and identification method based on deep learning, comprising:

obtaining food pictures ftom a canteen restaurant, building a food sample library $S_p$, and enhancing data for categories with fewer samples;

labeling the food sample library $S_p$ by using labeling software;

training a multi-target positioning network $Net_p$ by using, a convolutional neural network through the labeled sample library $S_p$;

rebuilding the sample library $S_p$ into a classification sample library $S_c$ by category;

training the rebuilt classification sample library Se through the convolutional neural network to obtain the classification network $Net_c$;

enabling the food pictures to be detected to sequentially pass through the general multi-target positioning network $Net_p$ and the classification network $Net_c$ to obtain an identification result.

The step of building the food sample library $S_p$ according to the obtained food pictures and enhancing data comprises:

collecting food picture samples from an actual restaurant;

enhancing data for categories with fewer samples and building the food sample library $S_p$.

The step of training a general multi-target positioning network $Net_p$ by using the convolutional neural network through the labeled food sample library $S_p$ comprises:

labeling the food sample library $S_p$ by using labeling software;

with a convolutional neural network as a basic network, training by using the labeled food sample library $S_p$ to obtain a multi-target positioning network $Net_p$.

The step of rebuilding the sample library $S_p$ into a classification sample library $S_c$ by category comprises:

rebuilding the labeled food sample library $S_p$ into a classification food sample library $S_c$ by category.

The step of training the rebuilt classification food sample library $S_c$ through the convolutional neural network to obtain the classification network $Net_c$ comprises:

with a convolutional neural network as a basic network, training by using the rebuilt classification food sample library $S_c$ to obtain a classification network $Net_c$.

The step of enabling the food pictures to be detected to sequentially pass through the general multi-target positioning network $Net_p$ and the classification network Nets to obtain an identification result comprises:

providing positioning information for the food pictures to be detected through the general multi-target positioning network $Net_p$;

extracting the pictures from the obtained positioning information;

inputting the extracted pictures into the classification network $Net_c$ to, obtain an identification result.

The food detection and identification method based on deep learning in the present invention identifies the food through two convolutional neural networks with different functions, i.e., the general multi-target positioning network and the classification network. Specifically, the present invention firstly establishes the food sample library $S_p$ through actual collection, trains the multi-target positioning network through the deep convolutional neural network after labeling to determine the position of each food in the food pictures to be detected, then rebuilds the labeled food sample library $S_p$ into a food classification sample library $S_c$ by category, and then trains the classification network through the deep convolutional neural network to determine the food category in the food pictures to be detected, so as to obtain a final identification result.

It can be known from the above technical solution that compared with the prior art, the present invention has the following beneficial effects:

The present invention conducts identification by two deep convolutional neural networks with different functions. Compared with the existing method which generally uses one general convolutional neural network, the present invention reduces the collection and labeling cost of the food. The general multi-target positioning network can be used generally in different restaurants without re-collecting food samples. Secondly, for special food of different restaurants, the general multi-target positioning network can also be used to rebuild the classification sample library, thereby reducing labor cost, shortening a training cycle and facilitating subsequent popularization.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
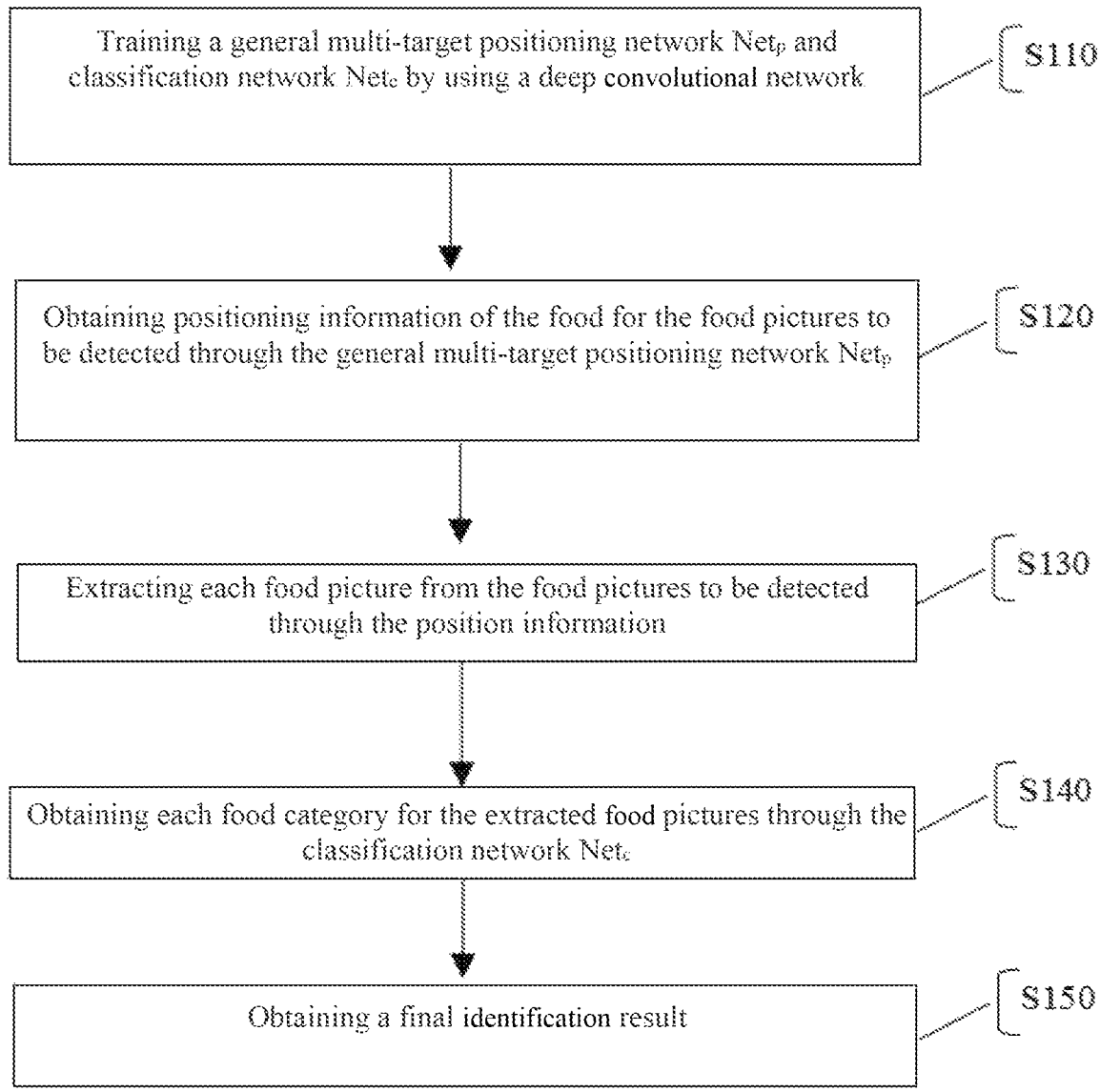
FIG. 1 is a flow chart of a food detection and identification method based on deep learning in an embodiment of the present application.

The present invention discloses a food detection and identification method based on deep learning. FIG. 1 shows an entire flow chart of an embodiment of the present application. Specific implementation is as follows:

step S110: collecting food sample pictures in an actual restaurant and labeling; building a food sample library $S_p$; training a general multi-target positioning network $Net_p$ by using a deep convolutional neural network; rebuilding a classification sample library $S_p$, according to the food sample library $S_p$; and training a classification network Net through deep convolutional neural network;

step S120: firstly obtaining positioning information of the food for the food pictures to be detected through the general multi-target positioning network $Net_p$;

step S130: extracting each food picture from the food pictures to be detected through the position information;

step S140: obtaining each food category for the extracted food pictures through the classification network $Net_c$;

step S150: obtaining a final identification result of the food pictures to be detected. Several key steps of the embodiments of the present application are described in detail.

Figure 2:
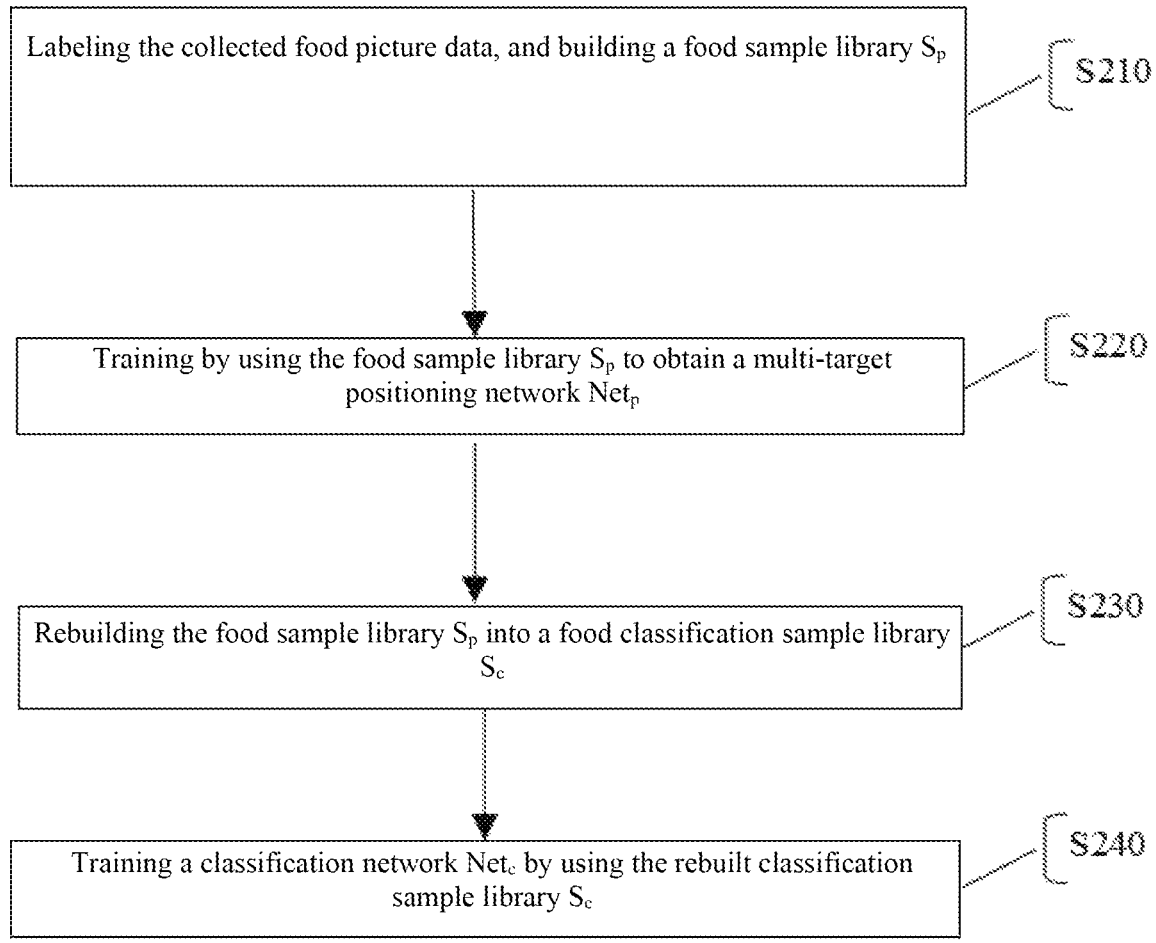
FIG. 2 is a flow chart of building of a food sample library $S_p$ and a classification sample library $S_c$ and training of a general multi-target positioning network $Net_p$ and a classification network $Net_c$ in an embodiment of the present application.

I. FIG. 2 shows the building of a food sample data set and a classification data set, and training of a general multi-target positioning network $Net_p$ and a classification network $Net_c$, wherein The initial food sample data set includes food with large color and shape spans.

Step S210: labeling the collected food picture data, and building a food sample library $S_p$;

Step S220: training by using the food sample library $S_p$ through a deep convolutional neural network to obtain a general multi-target positioning network $Net_p$;

Step S230: rebuilding the food sample library $S_p$ into a food classification sample library $S_c$ (in practical application, the general multi-target positioning network $Net_p$ can be used to create special food categories, and the food classification sample library $S_c$ of each restaurant can also be used to update the food sample library $S_p$);

Step S240: training a classification network $Net_c$ by using the rebuilt classification sample library $S_c$.

Figure 3:
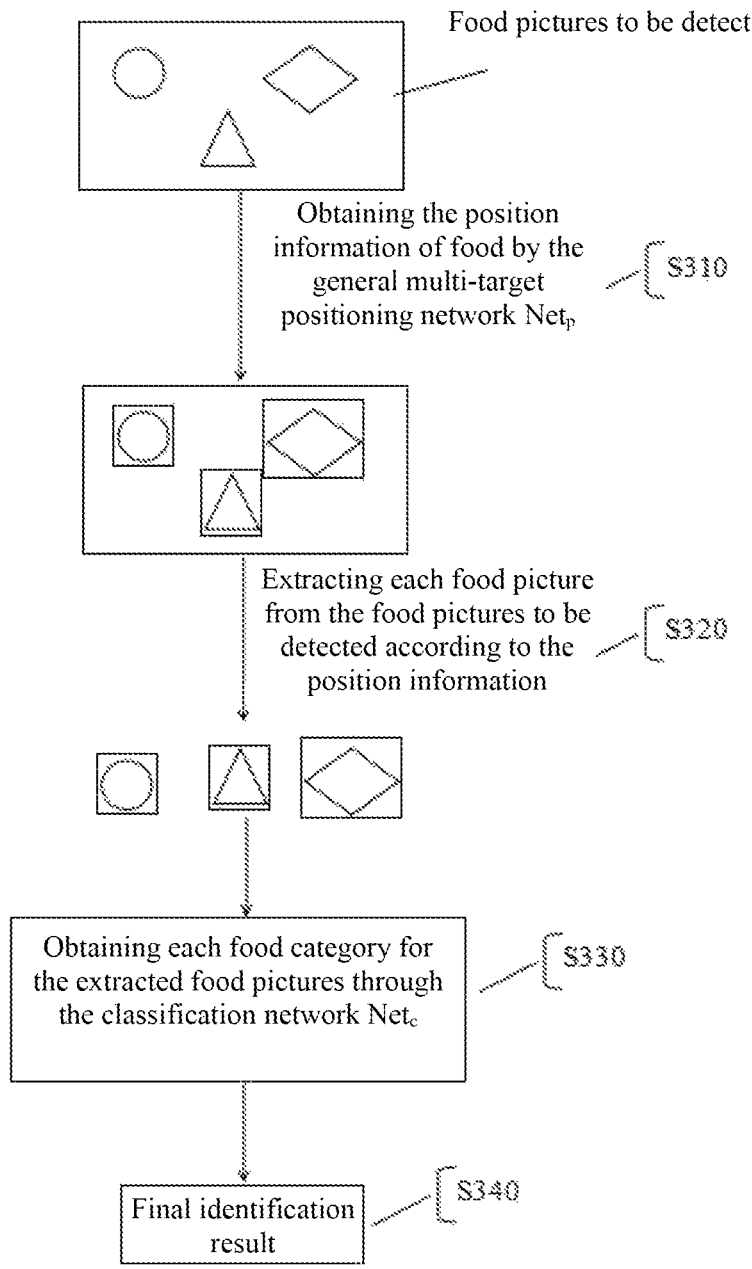
FIG. 3 is a flow chart of a food identification process in an embodiment of the present application.

II. FIG. 3 shows a food identification process, including:

step S310: obtaining positioning information of the food for the food pictures to be detected through the general multi-target positioning network $Net_p$;

step S320: extracting each food picture from the food pictures to be detected according to the position information;

step S330: obtaining each food category for the extracted food pictures through the classification network $Net_c$;

step S340: obtaining a final identification result.

Figure 4:
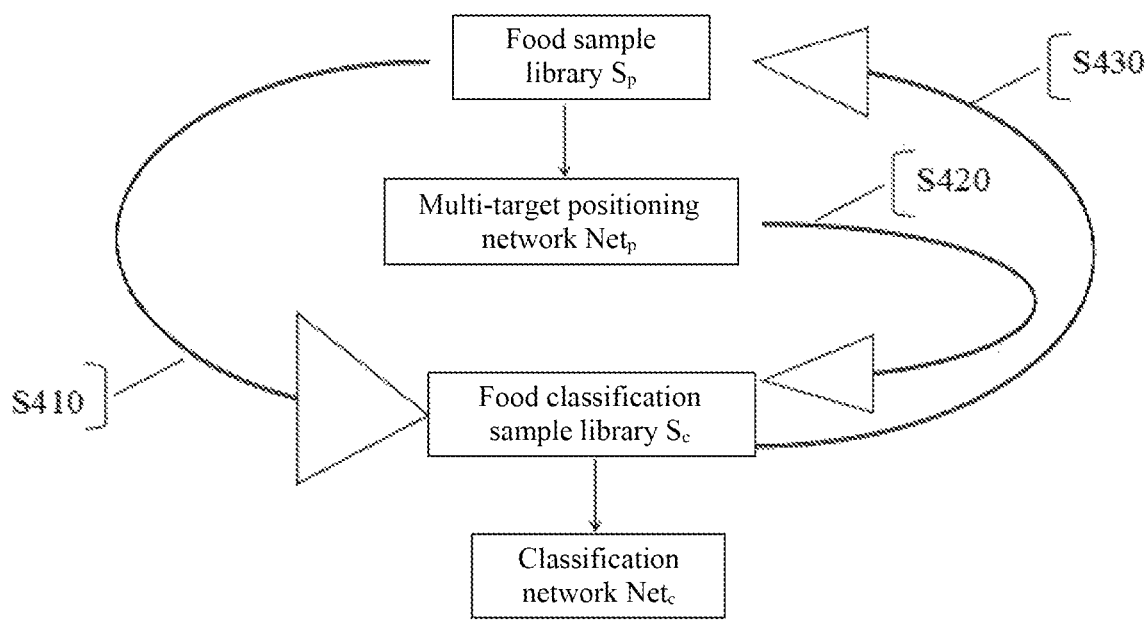
FIG. 4 is a closed-loop flow chart of a general multi-target positioning network $Net_p$ and a classification network $Net_c$ in an embodiment of the present application.

III. FIG. 4 shows that the general multi-target positioning network $Net_p$ and the classification network $Net_c$ mutually update the sample libraries $S_p$ and $S_c$, including:

step S410: rebuilding the food sample library $S_p$ into a food classification sample library $S_c$;

step S420: using the general multi-target positioning network $Net_p$ to update the food classification sample library $S_c$ from different restaurant food categories, thereby improving the accuracy of the classification network $Net_c$;

step S430: using the updated food classification sample library $S_c$ to update the food sample library $S_p$ through data enhancement, thereby improving the accuracy of the general multi-target positioning network $Net_p$.

Each embodiment in the description is described in a progressive way. The difference of each embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A food detection and identification method based on deep learning, realizing food identification by a deep convolutional network, and comprising the following steps:

obtaining food pictures from a canteen restaurant, building a food sample library, and enhancing data for categories of food with fewer samples;

labeling contents of the food sample library by using labeling contents of software;

training a multi-target positioning network using a convolutional neural network through the contents of the labeled food sample library $S_p$;

rebuilding the food sample library into a classification food sample library by category;

training the rebuilt classification sample library through the convolutional neural network to obtain a classification network;

and sequentially passing the food pictures through the multi-target positioning network and the classification network to obtain an identification result.

2. The food detection and identification method based on deep learning according to claim 1, wherein the step of building and labeling the contents of the food sample library and training the multi-target positioning network through the convolutional neural network comprises:

collecting various food pictures from the canteen restaurant, and building the food sample library;

labeling the contents of the food sample library by using labeling software;

training the multi-target positioning network by using the convolutional neural network through the labeled food sample library.

3. The food detection and identification method based on deep learning according to claim 1, wherein the step of rebuilding the classification sample library and training the classification network through the convolutional neural network comprises:

rebuilding the food sample library into a classification sample, library;

training a classification network through the convolutional neural network by using the rebuilt classification sample library.

4. The food detection and identification method based on deep learning according to claim 1, wherein the step of sequentially passing the food pictures through the multi-target positioning network and the classification network to obtain an identification result comprises:

obtaining the food pictures to be detected;

detecting the position information of food by the multi-target positioning network;

classifying the food by using the classification network;

outputting the identification result.

* * * * *